(12) United States Patent
Krebs et al.

(10) Patent No.: US 11,371,393 B2
(45) Date of Patent: *Jun. 28, 2022

(54) ARRANGEMENT FOR CONVERTING THERMAL ENERGY FROM LOST HEAT OF AN INTERNAL COMBUSTION ENGINE

(71) Applicant: Daimler AG, Stuttgart (DE)

(72) Inventors: Eugen Krebs, Stuttgart (DE); Nicolas Stanzel, Stuttgart (DE); Thomas Streule, Winnenden (DE)

(73) Assignee: Daimler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/955,260

(22) PCT Filed: Dec. 17, 2018

(86) PCT No.: PCT/EP2018/085260
§ 371 (c)(1),
(2) Date: Jun. 18, 2020

(87) PCT Pub. No.: WO2019/121542
PCT Pub. Date: Jun. 27, 2019

(65) Prior Publication Data
US 2020/0392922 A1 Dec. 17, 2020

(30) Foreign Application Priority Data
Dec. 21, 2017 (DE) .................... 10 2017 011 851.5

(51) Int. Cl.
*F01K 23/06* (2006.01)
*F02M 26/28* (2016.01)
(Continued)

(52) U.S. Cl.
CPC .............. *F01K 23/065* (2013.01); *F01K 7/16* (2013.01); *F01K 25/08* (2013.01); *F01N 5/02* (2013.01);
(Continued)

(58) Field of Classification Search
CPC . F01K 23/065; F01P 3/20–22; F02G 5/00–04
See application file for complete search history.

(56) References Cited

U.S. PATENT DOCUMENTS

2004/0250546 A1* 12/2004 Ichikawa .............. F01C 21/005
60/670
2013/0068202 A1* 3/2013 Kardos ................... F01P 7/165
123/563

(Continued)

FOREIGN PATENT DOCUMENTS

DE    10 2015 016 783 A1    8/2016
DE       102015016783 A1 *  8/2016  ............... F02G 5/02
(Continued)

OTHER PUBLICATIONS

PCT/EP2018/085260, International Search Report dated Mar. 25, 2019 (Two (2) Pages).
(Continued)

*Primary Examiner* — Laert Dounis
(74) *Attorney, Agent, or Firm* — Crowell & Moring LLP

(57) ABSTRACT

An arrangement for converting thermal energy from lost heat of an internal combustion engine into mechanical energy includes a working circuit for a working medium. An expansion engine is disposed in the working circuit. A heat exchanger is mounted upstream of the expansion engine in a flow direction of the working medium where the working circuit extends through the heat exchange. The heat exchanger includes an exhaust gas recirculation heat exchanger having a cold part and a warm part, an exhaust (Continued)

gas heat exchanger, and a phase transition cooling in the internal combustion engine. The heat exchanger is formed by serial connection in a sequence of the cold part of the exhaust gas recirculation heat exchanger, the exhaust gas heat exchanger, the phase transition cooling in the internal combustion engine, and the warm part of the exhaust gas recirculation heat exchanger.

6 Claims, 1 Drawing Sheet

(51) Int. Cl.
　　*F01K 7/16*　　(2006.01)
　　*F01K 25/08*　　(2006.01)
　　*F01N 5/02*　　(2006.01)
　　*F01P 3/22*　　(2006.01)
　　*F02G 5/04*　　(2006.01)
　　*F01P 3/00*　　(2006.01)

(52) U.S. Cl.
　　CPC .................. *F01P 3/22* (2013.01); *F02G 5/04* (2013.01); *F02M 26/28* (2016.02); *F01P 2003/001* (2013.01); *F01P 2003/225* (2013.01); *F02G 2260/00* (2013.01); *Y02T 10/12* (2013.01)

(56) References Cited

U.S. PATENT DOCUMENTS

| | | | |
|---|---|---|---|
| 2013/0199178 A1* | 8/2013 | Kanou | F02G 5/02 60/605.2 |
| 2014/0137554 A1* | 5/2014 | Ernst | F02M 26/00 60/615 |
| 2018/0372023 A1* | 12/2018 | Wu | F02G 5/02 |
| 2019/0368383 A1* | 12/2019 | Arnold | F01K 23/10 |
| 2020/0191020 A1* | 6/2020 | Delahanty | F02M 26/22 |
| 2020/0340371 A1* | 10/2020 | Stanzel | F01N 3/043 |

FOREIGN PATENT DOCUMENTS

| | | | |
|---|---|---|---|
| EP | 1 455 074 A1 | 9/2004 | |
| WO | WO 2010/000284 A2 | 1/2010 | |
| WO | WO-2010000284 A2 * | 1/2010 | F01N 5/02 |

OTHER PUBLICATIONS

U.S. Patent Application, "Arrangement for Converting Thermal Energy From Lost Heat of an Internal Combustion Engine", filed Jun. 18, 2020, Inventor: Nicolas Stanzel et al.

Chinese-language Office Action issued in Chinese Application No. 201880082287.3 dated Feb. 14, 2022 with partial English translation (five (5) pages).

* cited by examiner

ARRANGEMENT FOR CONVERTING THERMAL ENERGY FROM LOST HEAT OF AN INTERNAL COMBUSTION ENGINE

BACKGROUND AND SUMMARY OF THE INVENTION

The invention relates to an arrangement for converting thermal energy from lost heat of an internal combustion engine.

From US 2014/0137554 A1 a waste heat recovery system is known which connects a working fluid with fluid passages formed in an engine block and/or a cylinder head of an internal combustion engine to form a heat exchanger. The fluid passages are formed near high temperature regions of the engine to supply sufficient thermal energy to the working fluid to vaporize the working fluid while the working fluid advantageously cools the engine block and/or the cylinder head in order to improve the fuel efficiency. The arrangement of the engine heat exchanger downstream of the exhaust gas recirculation superheater and upstream of an exhaust gas heat exchanger leads to an optimal position of the engine heat exchanger with respect to the thermodynamic circuit of the waste heat recovery system, wherein the cooling of the recirculated exhaust gas is prioritized. The arrangement of valves in the waste heat recovery system offers the possibility to select a plurality of parallel flow paths for optimal operation.

The invention is based on the object of specifying an improved arrangement for converting thermal energy from lost heat of an internal combustion engine.

An arrangement in accordance with the invention for converting thermal energy from lost heat of an internal combustion engine, in particular of a motor vehicle, into mechanical energy comprises a working circuit for a working medium which can be heated and evaporated using the lost heat, wherein an expansion machine for obtaining mechanical energy from the heat of the working medium is provided in the working circuit, wherein the working circuit runs through a heat exchanger upstream of the expansion machine in the flow direction of the working medium wherein the heat exchanger comprises an exhaust gas recirculation heat exchanger having a colder part and a warmer part, an exhaust gas heat exchanger, and a phase transition cooling system in the internal combustion engine, wherein the heat exchanger is formed by serially interconnecting in order the colder part of the exhaust gas recirculation heat exchanger, exhaust gas heat exchanger, phase transition cooling system in the internal combustion engine, warmer part of the exhaust gas recirculation heat exchanger.

In one embodiment, at least one heat exchanger, in particular at least a part of the exhaust gas recirculation heat exchanger, is designed as a counter-current heat exchanger. To improve operation safety against overheating, the counterflow heat exchangers or parts of the counterflow heat exchangers can be replaced by co-current heat exchangers, but this is at the expense of system performance.

According to the invention, the exhaust gas heat exchanger is arranged in series in the working circuit upstream of the combustion engine and downstream of the colder part of the exhaust gas recirculation heat exchanger. In the internal combustion engine, the cooling is designed as phase change cooling (PCC). This makes it possible to use water or a water-ethanol mixture as the cooling medium and to operate at a high evaporation pressure. The phase change cooling enables a constantly high wall temperature, such that the so-called pinch point problem can be mitigated. A fuel savings potential of 7% to 8% when used in heavy commercial vehicles appears possible. Compared with a parallel interconnection, the fuel efficiency can be improved by 2%, for example.

Exemplary embodiments of the invention are explained in more detail below using the drawings.

DETAILED DESCRIPTION OF THE DRAWINGS

Figure 1:
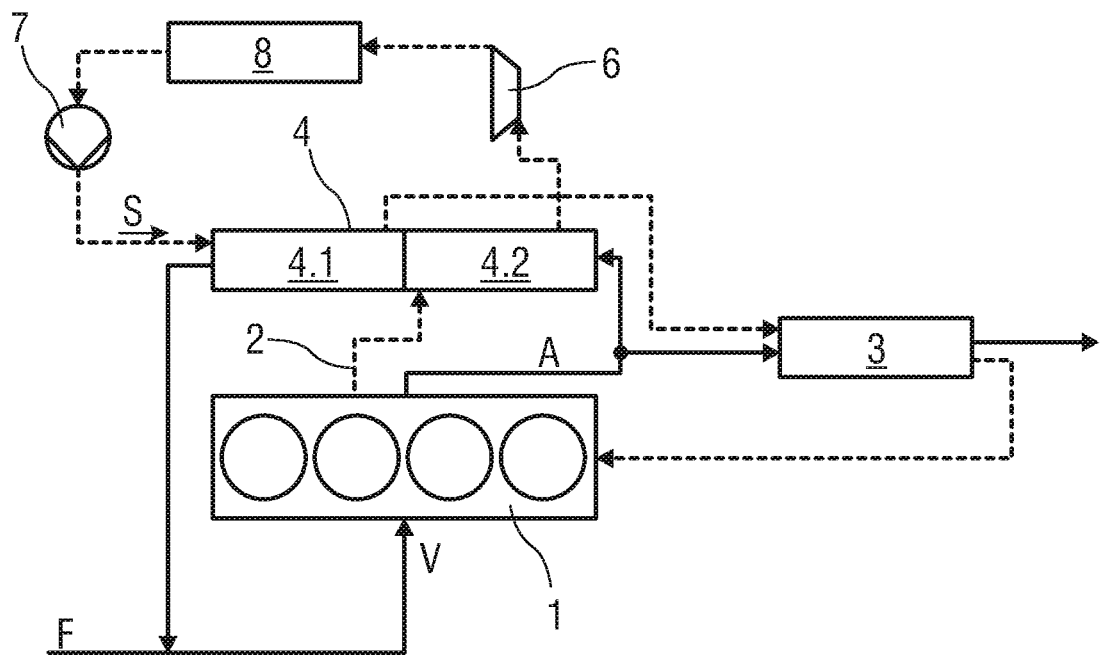
FIG. 1 is a schematic depiction of an internal combustion engine having a working circuit for exhaust gas heat recovery.

Parts corresponding to each other are marked with the same reference numerals in all Figures.

FIG. 1 is a schematic depiction of an internal combustion engine 1 having a working circuit 2, which is designed to carry out a steam cycle, in particular a Clausius Rankine cycle or an Organic Rankine cycle.

2 The internal combustion engine 1 is supplied with combustion air V, which consists in part of fresh air F. Exhaust gases A of the internal combustion engine 1 are partly discharged into the surroundings via an exhaust gas heat exchanger 3 and an exhaust system (not shown) and partly combined with the fresh air F via an exhaust gas recirculation heat exchanger 4 in order to form the combustion air V.

The exhaust gas recirculation heat exchanger 4 has a colder part 4.1 and a warmer part 4.2, wherein the colder part 4.1 is located in the exhaust gas flow downstream of the warmer part 4.2.

The working circuit 2 is led out of the colder part 4.1 of the exhaust gas recirculation heat exchanger 4 in series one after the other via the exhaust gas heat exchanger 3; the internal combustion engine 1 is led into the warmer part 4.2 of the exhaust gas recirculation heat exchanger 4. In the internal combustion engine 1, the cooling can be designed as phase change cooling (PCC). In the working circuit 2, a working medium is provided, for example water and/or ethanol and/or methanol.

In the working circuit 2, the working medium circulates, which can be heated and evaporated using lost heat, in particular exhaust gas heat and/or lost heat from the internal combustion engine 1. In the working circuit 2, after passing through the warmer part 4.2 of the exhaust gas recirculation heat exchanger 4, the working medium is supplied to an expansion engine 6 to obtain mechanical energy from the heat of the working medium. The working medium circulates in the working circuit 2, driven by a pump 7.

The working circuit 2 runs in the flow direction S of the working medium after the expansion engine 6 through a condenser 8 and the pump 7 back into the colder part 4.1 of the exhaust gas recirculation heat exchanger 4. The working medium is heated and at least partially evaporated by exhaust gas heat in the exhaust gas heat recirculation heat exchanger 4 and in the exhaust gas heat exchanger 3 as well as by engine heat in the internal combustion engine 1. In the expansion engine 6, the working medium expands, wherein thermal energy is converted into mechanical energy, which, where applicable, is subsequently converted into electrical energy by means of a generator (not shown) or used in some other way. Through the expansion, the working medium cools down and is then passed through the condenser 8 where it is cooled and condensed before it reached the pump 7 again.

Pressure and temperature of the evaporative cooling can be controlled as follows.

The temperature is cooled by means of a mass flow of the working medium. If the working medium temperature at the expansion engine inlet is to be decreased, the working medium mass flow must be increased. If the working medium temperature at the expansion engine inlet is to be increased, the working medium mass flow must be decreased. The pump 7 can be designed to be electrically variable, or it can also be coupled to the engine speed of a combustion engine 1 via a variable transmission. In the case of a rigid connection to the engine speed, the mass flow can be adjusted via a variable stroke or a bypass.

The evaporation pressure can be adjusted over a wide range via the speed of the expansion engine 6 by means of a volumetric expansion engine 6, which is designed as a scroll expander, screw, piston expander, for example, since the inlet volume flow and speed are almost linearly dependent on each other. If a turbine, e.g., a radial or axial turbine, is used as an expansion engine 6, the pressure is given by the effective cross section of the turbine and the flow rate. This cross-section can also be designed variably, e.g., by variably turbine geometry or a variable partial impingement.

For the evaporative cooling of an internal combustion engine 1, the combination of a volumetric expansion engine 6 and a turbine can prove to be particularly advantageous: with the speed of the volumetric expansion engine 6, the evaporation pressure can be adjusted. The downstream turbine is able to effectively utilize the large volume flow at very low condensation pressure in the case of small size. The working medium flow from the evaporator, i.e., the serial arrangement from the colder part 4.1 of the exhaust gas recirculation heat exchanger 4, the exhaust gas heat exchanger 3, the internal combustion engine 1 and the warmer part 4.2 of the exhaust gas recirculation heat exchanger 4, has a high temperature and a high evaporation pressure when fed into the volumetric expansion engine 6. The volumetric expansion engine 6 adjusts the inlet volume flow and thus the inlet pressure by its speed. The downstream turbine can still make effective use of the high volume flow resulting from the low condensation pressure in the case of an acceptable size. The working medium flow exiting from the expansion engine 6, which is designed as a turbine, for example, to the condenser 8 has a low temperature and a very low condensation pressure.

The pressure control can be based on the following criteria: in evaporative cooling, the evaporation pressure determines the wall temperature of the cooled parts. A high wall temperature results in a lower heat transfer during combustion and thus in a hotter and possibly faster combustion, which tends to produce more nitrogen oxide ($NO_x$). In $NO_x$-critical engine operation (e.g., in the city or in the case of cold exhaust gas after-treatment), a low evaporation pressure can be used specifically to reduce nitrogen oxide emissions.

In normal operation, the evaporation pressure should be set such that the wall temperatures reach values which are approximately those achievable with a conventional cooling system. Higher wall temperatures can also be operated safely because the temperature can be set much more precisely than is possible with cooling water. Therefore, less safety distance must be kept from critical values. Hotter wall temperatures lead to lower fuel consumption and higher $NO_x$ emissions. A compromise between these two emissions can be better set by the additional degree of freedom of the evaporation pressure.

If safe operation of the components to be cooled and compliance with the pollutant emissions is ensured, the evaporation pressure can be adjusted so that the capacity of the expansion engine 6 (or expansion engines) minus the capacity of the pump 7 is optimal.

The temperature control is intended to ensure that the highest temperature in the system does not exceed the decomposition temperature of the working fluid used or of any construction material used, for example for seals. Furthermore, the inlet temperature of the working medium into the expansion engine 6 should meet the requirements of the expansion engine 6. If a turbine is used, the outlet steam should not become too wet, so that the turbine is not endangered by dripping.

The following sensors can be provided: a pressure sensor at the inlet of the expansion engine 6, a temperature sensor at the inlet of the expansion engine 6, a pressure sensor and a temperature sensor at the inlet of the pump 7, a pressure sensor at the outlet of the pump 7.

In addition, a mass flow sensor can be provided after the pump 7, in particular if the pump 7 cannot be easily described by a model. Further temperature sensors can be provided before and/or after the individual parts of the evaporator, i.e., the colder part 4.1 of the exhaust gas recirculation heat exchanger 4, the exhaust gas heat exchanger 3, the internal combustion engine 1 and the warmer part 4.2 of the exhaust gas recirculation heat exchanger 4.

Figure 2:
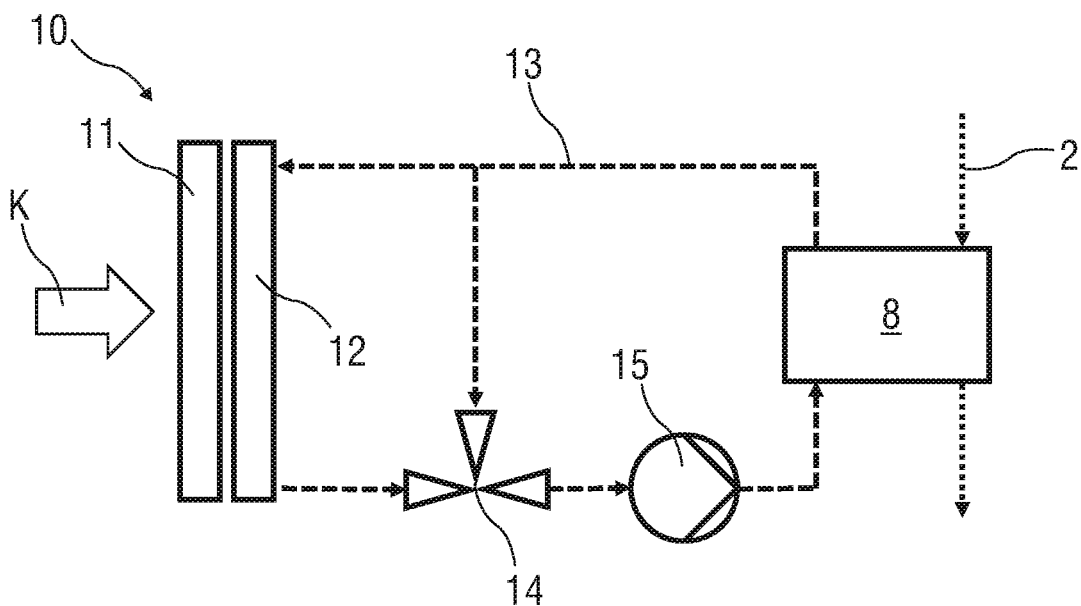
FIG. 2 is a schematic depiction of an additional cooling system.

FIG. 2 shows a schematic depiction of an additional cooling system 10. In a cooling air flow K, first of all, for example at the front of a vehicle, there is a charge air cooler 11. The charge air cooling can be direct or indirect; several stages are also possible in indirect systems. Other components requiring cooling at low temperature levels can also be integrated. A climate condenser (not depicted) can also be provided.

Downstream of the charge air cooler 11 in the cooling air flow K, a re-cooler 12 is provided for evaporation cooling. This should also be supplied with air which is as cool as possible. However, charge air cooling or low-temperature cooling has priority. The re-cooler 12 is located in a cooling water circuit 13. With the aid of a 3/2-way valve 14, the temperature of the cooling water circuit 13 is limited downwards to prevent too low condensation temperatures or, if water is used as the working medium, freezing. A cooling water pump 15 is preferably controllable (mechanically or electrically) and sets the mass flow in the cooling water circuit 13 so low that the sub-cooling of the pump 7 in the working circuit 2 is ensured. Optionally, the controllable cooling water pump 15 sets the mass flow in the cooling water circuit 13 so high that the performance balance of the system (performance of the expansion engine 6—performance of the pump 7—performance of the cooling water pump 15) is as optimal as possible. After the cooling water pump 15, the cooling water flows through the condenser 8 of the working circuit 2, which is designed as a condensation heat exchanger.

The described process control of an exhaust heat recovery system combines the approach of an increased temperature in the cylinder head with a serially interconnected exhaust heat recovery system. Due to the constantly high heat supply temperature in the cylinder head—a heat source such as exhaust gas cools down when heat is extracted from it, but the cylinder head does not due to the simultaneous heat supply from the combustion and friction—the efficient use of the working medium water (or water/ethanol mixture) is possible. This allows the efficiency of the waste heat recovery system to be almost doubled; at the same time, the heat input into the system is significantly increased by the additional heat input from the engine cooling system.

The system performance of the arrangement can thus be increased considerably. Further advantages can be achieved for the combustion, the exhaust gas after-treatment and for the charging. The combustion suffers less heat loss due to the more uniform wall temperatures, while the charging and exhaust gas after-treatment benefit due to the higher exhaust gas temperatures. In this way, the possibly higher $NO_x$ level can be overcompensated for by the more homogeneous wall temperature.

LIST OF REFERENCE CHARACTERS 1 internal combustion engine
2 working circuit
3 exhaust gas heat exchanger
4 exhaust gas recirculation heat exchanger
4.1 colder part
4.2 warmer part
6 expansion engine
7 pump
8 condenser
10 cooling system
11 charge air cooler
12 re-cooler
13 cooling water circuit
14 3/2-way valve
15 cooling water pump
A exhaust gas
F fresh air
K cooling air flow
S flow direction
V combustion air

The invention claimed is:

1. An arrangement for converting thermal energy from lost heat of an internal combustion engine into mechanical energy, comprising:
   a working circuit for a working medium which is heatable and evaporatable using the lost heat;
   an expansion engine disposed in the working circuit, wherein mechanical energy from heat of the working medium is obtainable by the expansion engine; and
   a heat exchanger mounted upstream of the expansion engine in a flow direction of the working medium, wherein the working circuit extends through the heat exchanger;
   wherein the heat exchanger comprises an exhaust gas recirculation heat exchanger having a cold part and a warm part, an exhaust gas heat exchanger, and a phase transition cooling in the internal combustion engine;
   wherein the heat exchanger is formed by serial connection in a sequence of the cold part of the exhaust gas recirculation heat exchanger, the exhaust gas heat exchanger, the phase transition cooling in the internal combustion engine, and the warm part of the exhaust gas recirculation heat exchanger.

2. The arrangement according to claim 1, wherein the working medium is water and/or ethanol and/or methanol.

3. The arrangement according to claim 1, wherein a temperature of the internal combustion engine is controllable by a mass flow of the working medium.

4. The arrangement according to claim 1, wherein the expansion engine comprises a volumetric expansion engine.

5. The arrangement according to claim 1, wherein the expansion engine comprises a turbine.

6. The arrangement according to claim 1 further comprising a cooling system which is cooled by cooling air and is configured to cool a condenser of the working circuit, wherein the condenser is a condensation heat exchanger.

* * * * *